United States Patent
Phanse et al.

(10) Patent No.: US 6,259,302 B1
(45) Date of Patent: Jul. 10, 2001

(54) GAIN CONTROL SIGNAL GENERATOR THAT TRACKS OPERATING VARIATIONS DUE TO VARIATIONS IN MANUFACTURING PROCESSES AND OPERATING CONDITIONS BY TRACKING VARIATIONS IN DC BIASING

(75) Inventors: Abhijit Phanse, Santa Clara; Wong Hee, San Jose, both of CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/176,784

(22) Filed: Oct. 22, 1998

(51) Int. Cl.[7] .................................................. G06G 7/12
(52) U.S. Cl. ......................... 327/362; 327/538; 327/355; 327/560
(58) Field of Search .................................. 327/362, 369, 327/378, 580, 538, 540, 355, 361, 560–563; 341/126, 144; 375/229, 230, 232

(56) References Cited

U.S. PATENT DOCUMENTS

| | | | |
|---|---|---|---|
| 4,563,670 | * | 1/1986 | Stallkamp et al. ................ 341/119 |
| 5,162,678 | * | 11/1992 | Yamasaki ............................ 327/331 |
| 5,200,655 | * | 4/1993 | Feldt ................................... 327/346 |
| 5,260,614 | * | 11/1993 | Theus et al. ........................ 327/362 |
| 5,303,264 | * | 4/1994 | Ohsawa .............................. 375/12 |
| 5,305,351 | * | 4/1994 | Mizoguchi ......................... 375/14 |
| 5,614,851 | * | 3/1997 | Holzer et al. ...................... 327/58 |
| 5,621,341 | * | 4/1997 | Schrader et al. .................. 327/102 |
| 5,640,122 | * | 6/1997 | McClure ............................. 327/530 |
| 5,684,481 | * | 11/1997 | Ashe ................................... 341/139 |
| 5,914,630 | * | 6/1999 | Peterson ............................. 327/513 |
| 5,977,813 | * | 11/1999 | Boerstler ............................ 327/378 |
| 6,011,428 | * | 1/2000 | Tsukude et al. ................... 327/541 |
| 6,084,466 | * | 7/2000 | Phanse et al. ..................... 327/560 |

* cited by examiner

Primary Examiner—Timothy P. Callahan
Assistant Examiner—Hai L. Nguyen
(74) Attorney, Agent, or Firm—Baker & McKenzie

(57) ABSTRACT

A gain controller for a signal mixer in which consistent circuit gain is maintained by using transistors in the gain control and signal mixing stages with equal corresponding device dimensions and by using a differential gain control voltage with inverse and noninverse differential voltage phases which individually track variations in the dc bias currents used to power the gain control and signal mixing stages. This provides a gain factor which is independent of variations in circuit operation due to variations in circuit manufacturing processes and operating voltages and temperatures. Such a gain controller provides a self-compensating gain control signal which is based upon a variable gain control factor and tracks variations in circuit operation due to variations in circuit manufacturing processes and operating voltages and temperatures by tracking variations in the dc biasing used to power the gain control and signal mixing stages. Such tracking of the biasing by the gain control advantageously provides for an increased dynamic range.

31 Claims, 5 Drawing Sheets

GAIN CONTROL SIGNAL GENERATOR THAT TRACKS OPERATING VARIATIONS DUE TO VARIATIONS IN MANUFACTURING PROCESSES AND OPERATING CONDITIONS BY TRACKING VARIATIONS IN DC BIASING

BACKGROUND OF THE INVENTION

1. Field of the Invention

The present invention relates to adaptive signal equalizers for adaptively equalizing high data rate signals received via long lengths of cable, and in particular, to gain controllers for controlling the signal gain of such adaptive signal equalizers.

2. Description of the Related Art

Figure 1:
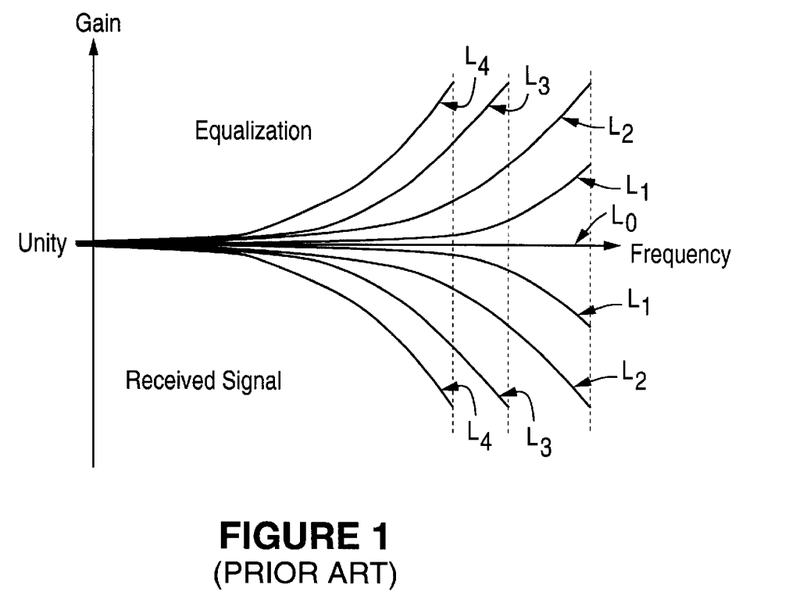
FIG. 1 is a graph of gain versus frequency for illustrating the complementary relationship between signal strength and corresponding equalization provided by a signal equalizer.

As part of the process of recovering data which has been transmitted over a long length of cable at a high data rate, equalization of the received data signal is required in order to compensate for the loss and phase dispersion characteristics of the cable. For example, referring to FIG. 1, the signal losses associated with a cable increase with frequency, and such signal losses become greater as the cable length is increased from a virtually zero length $L_0$ to greater cable lengths $L_1, L_2, L_3, \ldots$. Therefore, higher order frequency components of the data signal become increasingly attenuated as compared to the lower order frequency components. Accordingly, the degree of signal equalization required increases with frequency as well as cable length.

Further, in those applications where the transmission cable lengths may vary, such equalization must be adaptive by being able to adapt to variations in the transfer function of the cable due to variations in the cable length.

Figure 2:
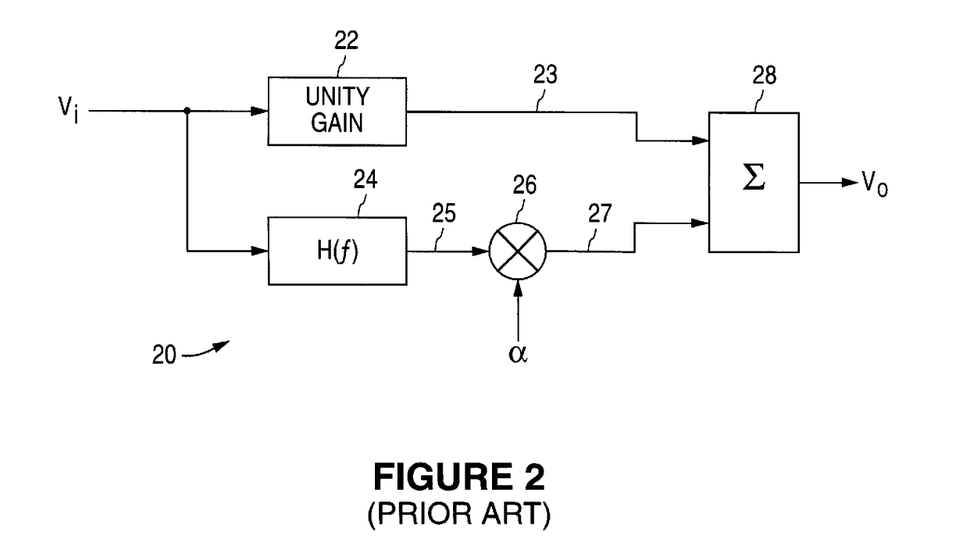
FIG. 2 is a functional block diagram of a conventional adaptive signal equalizer.

Referring to FIG. 2, a conventional adaptive equalizer 20 includes a unity-gain buffer 22, a high-pass filter 24, a mixer 26 and a signal summation stage 28, interconnected as shown. The input signal $V_i$ is processed by both the unity-gain buffer stage 22 and filtered by the high-pass filter 24. The high-pass filtered signal 25 is mixed with a gain control signal $\alpha$ in the mixer 26. The unity-gain buffered signal 23 and gain-controlled, high-pass filtered signal 27 are summed together in the summation circuit 28 to produce the final output signal $V_o$.

Figure 3:
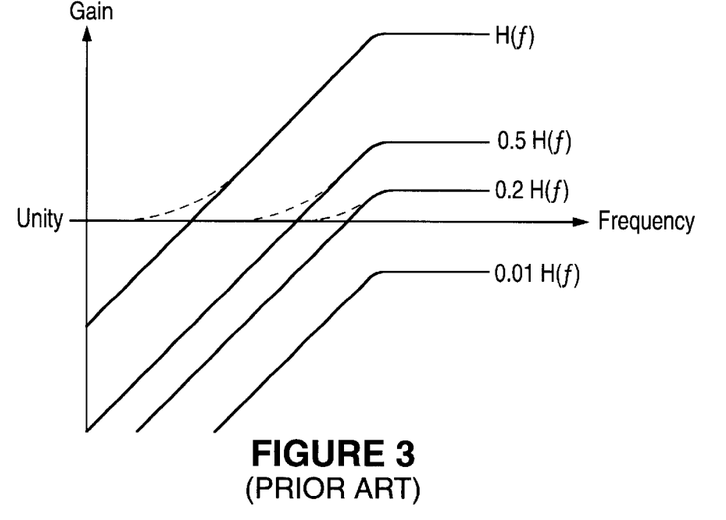
FIG. 3 is a graph of gain versus frequency for the gain-controlled, high-pass filtered portion of equalizer of FIG. 2.

Referring to FIG. 3, it can be seen that by varying the value of the control signal $\alpha$, the overall gain of the high-pass filter profile can be adjusted, thereby providing for adaptive equalization of the output signal $V_o$.

While this conventional technique performs reasonably well, a number of disadvantages exist, particularly when more precise equalization control is desired. For example, depending upon a number of operating parameters of the equalization circuit 20, such as variations in processing during manufacturing and variations in operating voltages and temperatures, the gain factor $\alpha$ may affect the DC biasing of portions of the circuit 20. Further, the output signal $V_o$ may be affected by variations in the DC bias components within the circuit 20. Accordingly, it would be desirable to have a gain-controlled adaptive equalizer in which the gain factor $\alpha$ is independent of variations in circuit operation due to variations in circuit manufacturing processes and operating voltages and temperatures.

SUMMARY OF THE INVENTION

A gain controller for an adaptive equalizer in accordance with the present invention provides a gain factor which is independent of variations in circuit operation due to variations in circuit manufacturing processes and operating voltages and temperatures. Such a gain controller provides a self-compensating gain control signal which is based upon a variable gain control factor and tracks variations in circuit operation due to variations in circuit manufacturing processes and operating conditions (e.g., voltages and temperatures) by tracking variations in the dc biasing used to power the gain control and signal mixing stages. Such tracking of the biasing by the gain control advantageously provides for an increased dynamic range.

In accordance with one embodiment of the present invention, a gain controller for a signal combining circuit includes a reference signal generator circuit and a signal conversion circuit. The reference signal generator circuit is configured to receive a first bias signal and in accordance therewith provide first and second reference signals. Variations in the first bias signal are tracked by corresponding respective variations in the first and second reference signals. The signal conversion circuit, coupled to the reference signal generator circuit, is configured to receive an input control signal and the first and second reference signals and in accordance therewith provide first and second output control signals. The input control signal has a range of values with a minimum value and a maximum value. The first output control signal has a range of values which correspond to the input control signal values with minimum and maximum values which correspond to the minimum and maximum input control signal values, respectively. The second output control signal has a range of values which correspond to the input control signal values with minimum and maximum values which correspond to the maximum and minimum input control signal values, respectively. The first and second output control signals together form a differential control signal.

In accordance with another embodiment of the present invention, a gain controller for a signal combining circuit includes a reference signal generator circuit and a digital-to-analog signal conversion circuit. The reference signal generator circuit with a plurality of diode-connected transistors configured to receive a first bias current and in accordance therewith provide first and second reference voltages. Variations in the first bias current are tracked by corresponding respective variations in the first and second reference voltages. The digital-to-analog signal conversion circuit, coupled to the reference signal generator circuit, is configured to receive a digital control signal and the first and second reference voltages and in accordance therewith provide first and second analog control voltages. The digital control signal has a range of values with a minimum value and a maximum value. The first analog control voltage has a range of values which correspond to the digital control signal values with minimum and maximum values which correspond to the minimum and maximum digital control signal values, respectively. The second analog control voltage has a range of values which correspond to the digital control signal values with minimum and maximum values which correspond to the maximum and minimum digital control signal values, respectively. The first and second analog control voltages together form a differential control voltage.

In accordance with still another embodiment of the present invention, a method of providing gain control for a signal combining circuit includes the steps of:

receiving a first bias signal and in accordance therewith generating first and second reference signals, wherein variations in the first bias signal are tracked by corresponding respective variations in the first and second reference signals; and receiving an input control signal and the first and second reference signals and in accordance therewith generating first and second output control signals, wherein
the input control signal has a range of values with a minimum value and a maximum value,
the first output control signal has a range of values which correspond to the input control signal values with minimum and maximum values which correspond to the minimum and maximum input control signal values, respectively,
the second output control signal has a range of values which correspond to the input control signal values with minimum and maximum values which correspond to the maximum and minimum input control signal values, respectively, and
the first and second output control signals together form a differential control signal.

In accordance with yet another embodiment of the present invention, a method of providing gain control for a signal combining circuit includes the steps of:

receiving a first bias current and in accordance therewith generating first and second reference voltages with a plurality of diode-connected transistors, wherein variations in the first bias current are tracked by corresponding respective variations in the first and second reference voltages; and receiving a digital control signal and the first and second reference voltages and in accordance therewith generating first and second analog control voltages, wherein
the digital control signal has a range of values with a minimum value and a maximum value,
the first analog control voltage has a range of values which correspond to the digital control signal values with minimum and maximum values which correspond to the minimum and maximum digital control signal values, respectively,
the second analog control voltage has a range of values which correspond to the digital control signal values with minimum and maximum values which correspond to the maximum and minimum digital control signal values, respectively, and
the first and second analog control voltages together form a differential control voltage.

These and other features and advantages of the present invention will be understood upon consideration of the following detailed description of the invention and the accompanying drawings.

DETAILED DESCRIPTION OF THE INVENTION

Figure 4:
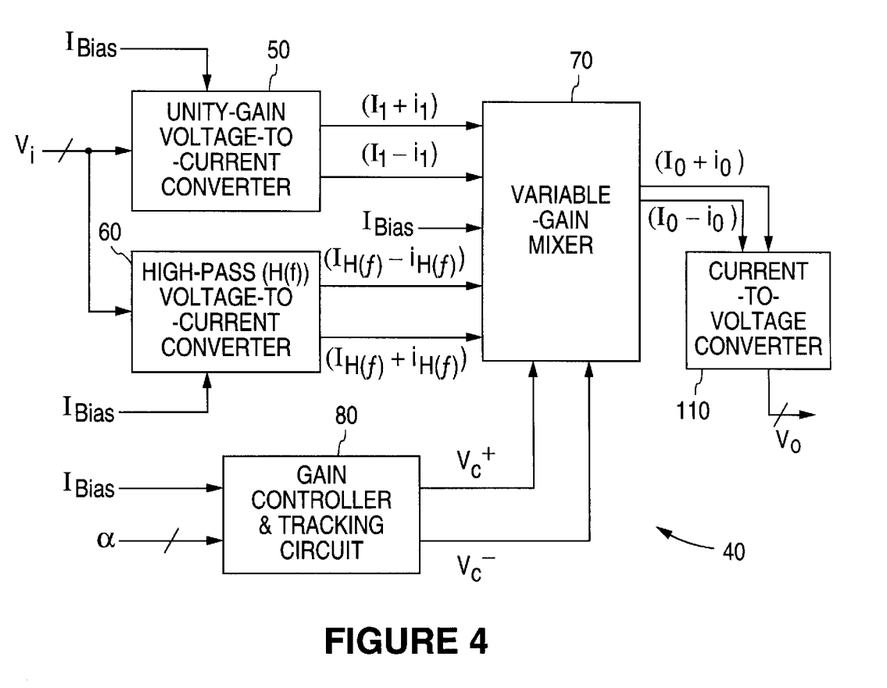
FIG. 4 is a functional block diagram of an adaptive signal equalizer in accordance with one embodiment of the present invention.

Referring to FIG. 4, an adaptive equalizer 40 in accordance with one embodiment of the present invention includes a unity-gain voltage-to-current converter 50, a high-pass voltage-to-current converter 60, a variable-gain mixer 70, a gain controller and tracking circuit 80 and a current-to-voltage converter 110, interconnected substantially as shown. The input signal voltage $V_i$ (which is differential with noninverse $V_i^+$ and inverse $V_i^-$ components) is buffered by the unity-gain voltage-to-current converter 50 which is biased by a bias current $I_{Bias}$ to produce a differential output current signal $(I_I+i_I)/(I_I-i_I)$ which includes a bias component $I_I$ and a signal component $i_I$. (As should be understood, the bias component is that which is due to the DC biasing of the circuit, while the signal component is that which is due to the input signal.) The input signal $V_i$ is also high-pass filtered by the high-pass voltage-to-current converter 60, which is also biased by the DC bias current $I_{Bias}$. This stage 60 produces a differential high-pass filtered signal $(I_{H(f)}+i_{H(f)})/(I_{H(f)}-i_{H(f)})$ which includes a bias component $I_{H(f)}$ and a signal component $i_{H(f)}$. Both of these signals $(I_I+i_I)/(I_I-i_I)$, $(I_{H(f)}+i_{H(f)})/(I_{H(f)}-i_{H(f)})$ are provided to the variable-gain mixer 70.

The gain controller and tracking circuit 80 is also biased by the DC bias current $I_{Bias}$, and receives a digital (e.g., 8-bit) gain control signal $\alpha$. In accordance with such gain control signal $\alpha$, the gain controller and tracking circuit 80 generates a differential gain control signal $V_c$, which has a noninverse component $V_c^+$ and an inverse component $V_c^-$. These differential control voltage components $V_c^+$, $V_c^-$ are provided to the variable-gain mixer 70.

The variable-gain mixer 70 is also biased by the DC bias current $I_{Bias}$. In accordance with the control voltage components $V_c^+$, $V_c^-$, which represent the gain factor $\alpha$, the variable gain mixer 70 mixes its three input current signals: the DC bias current $I_{Bias}$; the unity-gain current signal $(I_I+i_I)$; and the high-pass filtered current signal $(I_{H(f)}+i_{H(f)})/(I_{H(f)}-i_{H(f)})$. Based upon the mixing of these signals, the variable-gain mixer 70 generates an output current $(I_O+i_O)/(I_O-i_O)$ which includes a bias component $I_O$ and a signal component $i_O$.

The output current $(I_O+i_O)/(I_O-i_O)$ from the variable-gain mixer 70 is converted to an output voltage $V_o$ (which is differential with noninverse $V_o^+$ and inverse $V_o^-$ components) by the current-to-voltage converter 110.

Figure 5:
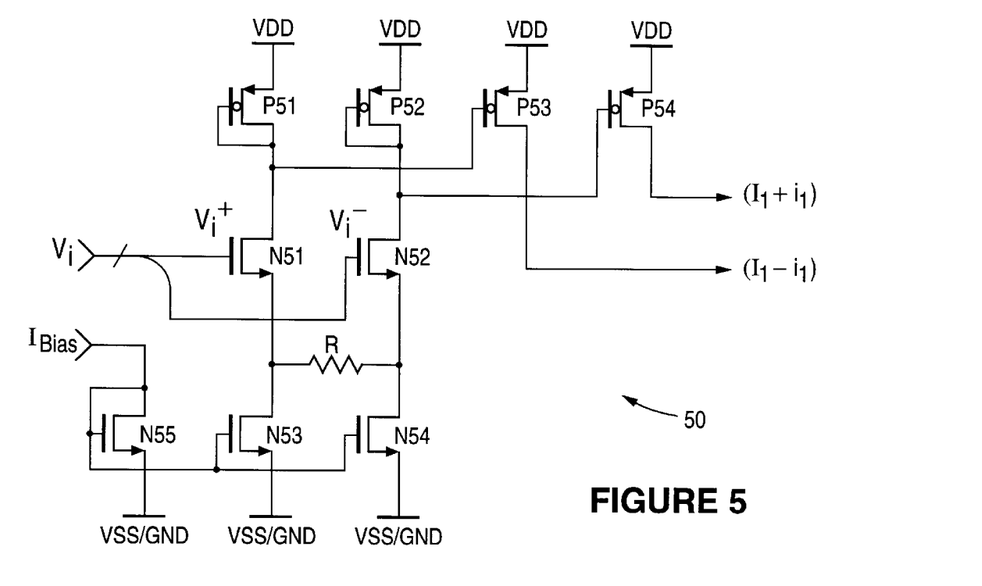
FIG. 5 is a schematic diagram of the unity-gain, voltage-to-current converter stage of the circuit of FIG. 4.

Referring to FIG. 5, the unity-gain voltage-to-current converter 50 includes a differential amplifier combined with two current mirrors biased between the positive VDD and negative VSS/GND terminals of the power supply. The differential amplifier includes transistors P51, P52, N51, N52, N53 and N54 (the prefix "P" designates a P-channel metal oxide semiconductor field effect transistor (P-MOSFET) and the prefix "N" designates an N-channel MOSFET (N-MOSFET)). The bias current mirror includes transistors N55, N53 and N54. The signal current mirror includes transistors P51, P52, P53 and P54.

The DC biasing for the differential amplifier includes driving the bias current mirror with the DC bias current $I_{Bias}$. The gain for the differential amplifier is established by a resistor R connected between the two differential amplifier circuit branches. The inputs to the differential amplifier are driven by the noninverse $V_i^+$ and inverse $V_i^-$ components of the differential input signal voltage $V_i$. The resulting differential currents, i.e., the drain currents of transistors N51 and N52, are replicated by the signal current mirror to produce a differential output current with a noninverse component $(I_I+i_I)$ and an inverse component $(I_1-i_I)$. The bias component $I_I$ is that component of the output current signal which corresponds to the DC biasing for the circuit, i.e., the input DC bias current $I_{Bias}$. The signal component $i_I$ is that component of the output current signal which corresponds to the input signal, i.e., the input signal voltage $V_i$.

Figure 6:
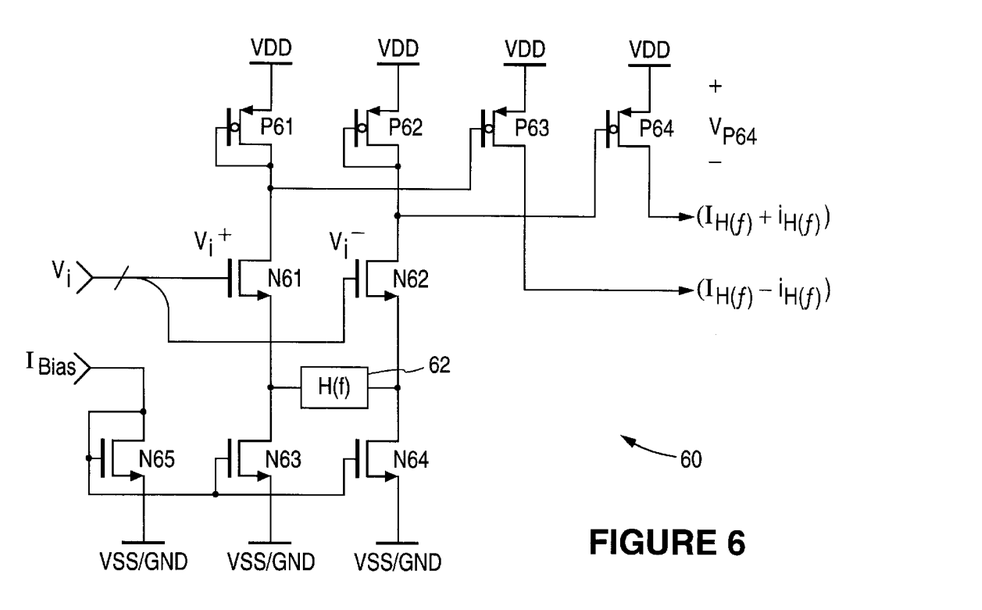
FIG. 6 is a schematic diagram of the high-pass, voltage-to-current converter stage of the circuit of FIG. 4.

Referring to FIG. 6, the high-pass voltage-to-current converter 60 also includes a differential amplifier combined with two current mirror circuits biased between the positive VDD and negative VSS/GND terminals of the power supply. The differential amplifier includes transistors P61, P62, N61, N62, N63 and N64. The bias current mirror includes transistors N65, N63 and N64. The signal current mirror includes transistors P61, P62, P63 and P64.

The DC biasing for the differential amplifier includes driving the input to the bias current mirror with the DC bias current $I_{Bias}$. The high-pass filter transfer function for the differential amplifier is established by connecting a high-pass filter circuit 62 between the two differential amplifier circuit branches. The differential amplifier is driven by the noninverse $V_i^+$ and inverse $V_i^-$ components of the differential input signal voltage $V_i$. The resulting differential currents, i.e., the drain currents of transistors N61 and N62, are replicated by the signal current mirror to provide a differential output current with a noninverse component $(I_{H(f)}+i_{H(f)})$ and an inverse component $(I_{H(f)}-i_{H(f)})$. The bias component $I_{H(f)}$ and signal component $i_{H(f)}$ of the output current signals correspond to the DC bias current $I_{Bias}$ and input signal voltage $V_i$, respectively.

Figure 7:
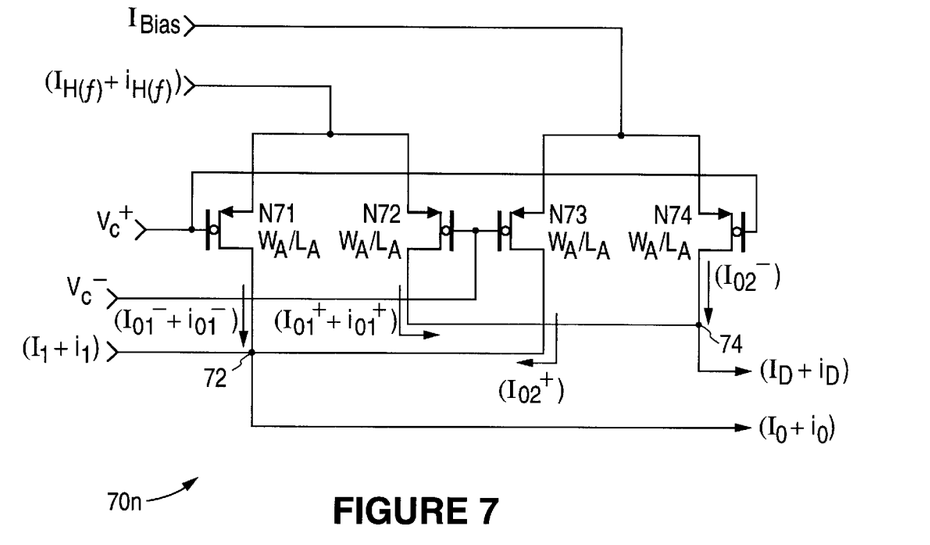
FIG. 7 is a schematic diagram of the "noninverse component" section of the variable-gain mixer stage of the circuit of FIG. 4.

Referring to FIG. 7, the "noninverse component" section 70n of the variable-gain mixer 70 includes two cross-connected differential amplifier circuits: transistors N71 and N72; and transistors N73 and N74. (Only that portion 70n of the variable-gain mixer 70 which is responsible for processing the noninverse components of the differential signals is shown here; however, it should be understood that a similar section is used for processing the inverse components.) All of the differential amplifier transistors N71, N72, N73, N74 have equal channel widths $W_A$ and lengths $L_A$. The first differential amplifier is driven by the noninverse component $(I_{H(f)}+i_{H(f)})$ of the high-pass filtered signal current and the differential control voltage $V_c$ (which represents the gain factor $\alpha$). This results in a differential output current with an inverse component $(I_{o1}^-+i_{o1}^-)$ which is provided to an output summing node 72 and a noninverse component $(I_{o1}^++i_{o1}^+)$ which is provided to a "discard" summing node 74.

The second differential amplifier is driven by the DC bias current $I_{Bias}$ and the differential control voltage $V_c$. This produces a differential output current with a noninverse component $(I_{o2}^+)$ which is provided to the output summing node 72 and an inverse component $(I_{o2}^-)$ which is provided to the "discard" summing node 74. The output summing node 72 also receives the noninverse unity-gain signal current component $(I_I+i_I)$ and sums it together with the first inverse differential output current component $(I_{o1}^-+i_{o1}^-)$ and second noninverse differential output current component $(I_{o2}^+)$ to produce an output current $(I_O+i_O)$. Similarly, the "discard node" 74 sums together the second noninverse differential output current component $(I_{o1}^++i_{o1}^+)$ and second inverse differential output current component $(I_{o2}^-)$ to produce a "discard" current $(I_D+i_D)$.

The output current $(I_O+i_O)$ can be expressed in terms of the DC bias current $I_{Bias}$, the gain factor $\alpha$ (represented by the differential gain control signal $V_c$), the high-pass signal component $(I_{H(f)}+i_{H(f)})$ and the unity-gain signal current component $(I_I+i_I)$ as shown below in Equation 1.

$$I_O+i_O=(I_I+i_I)+\alpha(I_{H(f)}+i_{H(f)})+(1-\alpha)(I_{Bias}) \quad \text{Eq. 1}$$

This expression can be rewritten to separate the bias and signal components as shown below in Equation 2.

$$I_O+i_O=(i_I+\alpha i_{H(f)})+(I_I+\alpha I_{H(f)}+(1-\alpha)I_{Bias}) \quad \text{Eq. 2}$$

Accordingly, the signal $i_O$ and bias $I_O$ output current components can be expressed shown below in Equations 3 and 4, respectively.

$$i_O=i_I+\alpha i_{H(f)} \quad \text{Eq. 3}$$

$$I_O=I_I+\alpha I_{H(f)}+I_{Bias}-\alpha I_{Bias} \quad \text{Eq. 4}$$

With the bias component $I_{H(f)}$ of the high-pass filtered signal current component $(I_{H(f)}+i_{H(f)})$ equal to the DC bias current $I_{Bias}$, the bias component $I_O$ of the output current $(I_O+i_O)$ can be expressed as shown below in Equation 5.

$$I_O=I_I+I_{Bias} \quad \text{Eq. 5}$$

Similarly, the "discard" current $(I_D+i_D)$ can be expressed as shown below in Equation 6.

$$I_D+i_D=(1-\alpha)(I_{H(f)}+i_{H(f)})+\alpha I_{Bias} \quad \text{Eq. 6}$$

This expression can be rewritten to show its dependence upon the gain control factor $\alpha$ as shown below in Equation 7.

$$I_D+i_D=I_{H(f)}-\alpha(I_{H(f)}-I_{Bias})+(1-\alpha)i_{H(f)} \quad \text{Eq. 7}$$

Accordingly, the signal $i_D$ and bias $I_D$ current components can be expressed as shown below in Equations 8 and 9, respectively.

$$i_D=(1-\alpha)i_{H(f)} \quad \text{Eq. 8}$$

$$I_D=I_{H(f)}-\alpha I_{H(f)}+\alpha I_{Bias} \quad \text{Eq. 9}$$

With the bias component $I_{H(f)}$ of the high-pass filtered signal $(I_{H(f)}+i_{H(f)})$ equal to the DC bias current $I_{Bias}$, as noted above, the "discard" current bias component $I_D$ can be xpressed as shown below in Equation 10.

$$I_D=I_{H(f)} \quad \text{Eq. 10}$$

Figure 8:
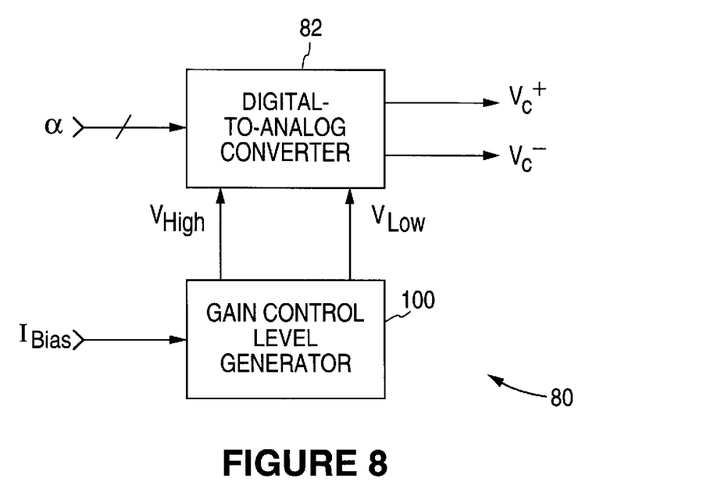
FIG. 8 is a functional block diagram of the gain controller and tracking circuit stage of the circuit of FIG. 4.

Referring to FIG. 8, a gain controller and tracking circuit 80 (FIG. 4) in accordance with one embodiment of the present invention includes a digital-to-analog converter 82 and a gain control level generator 100. (Alternatively, instead of a digital-to-analog converter, a pulse density modulator could be used.) The digital-to-analog converter 82 converts the digital gain control factor $\alpha$ into the differential control voltage components $V_c^+$, $V_c^-$ used by the variable-gain mixer 70. These differential control voltage components $V_c^+$, $V_c^-$ are generated based upon two reference voltages $V_{High}$, $V_{Low}$ provided by the gain control level generator 100 which is biased by the DC bias current $I_{Bias}$.

Figure 9:
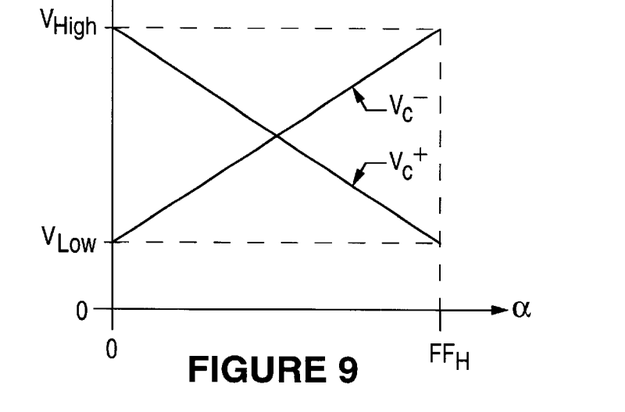
FIG. 9 is a graph of the voltage versus gain factor for the digital-to-analog converter stage of the circuit of FIG. 8.

Referring to FIG. 9, the differential control voltage components $V_c^+$, $V_c^-$ vary in value, in a differential manner, between the low $V_{Low}$ and high $V_{High}$ reference voltage values, in accordance with the value of the gain control factor α. For example, when the gain control factor α is equal to zero, the noninverse $V_c^+$ and inverse $V_c^-$ components are equal to the high $V_{High}$ and low $V_{Low}$ reference voltages, respectively. Conversely, when α is at its maximum value, e.g., FF(hex), the noninverse $V_c^+$ and inverse $V_c^-$ control voltage components are equal to the low $V_{Low}$ and high $V_{High}$ reference voltages, respectively.

Figure 10:
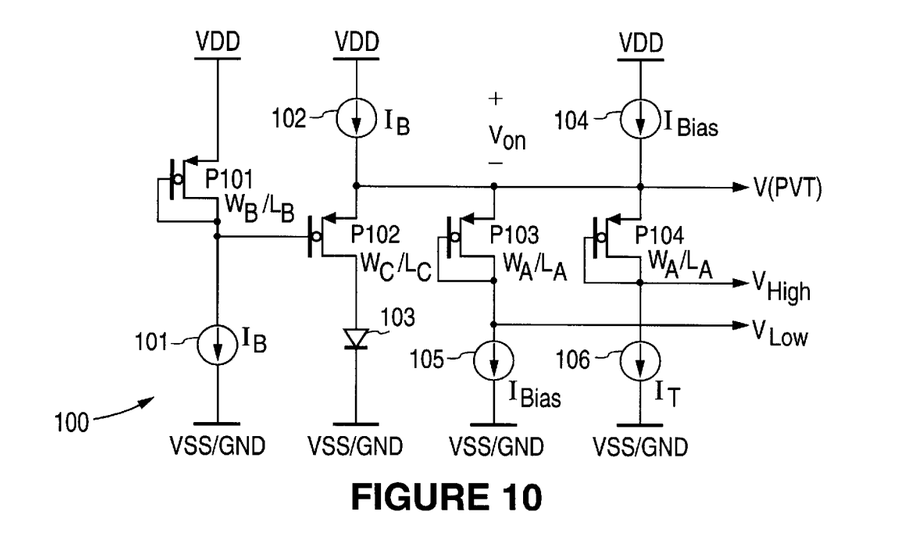
FIG. 10 is a schematic diagram of the gain control level generator stage of the circuit of FIG. 8.

Referring to FIG. 10, a gain control level generator 100 (FIG. 8) in accordance with one embodiment of the present invention includes four transistors P101, P102, P103, P104, a diode 103 and five current sources 101, 102, 104, 105, 106, all interconnected substantially as shown. Transistors P101 (with channel width and length dimensions of $W_B$ and $L_B$, respectively) and P102 (with channel width and length dimensions of $W_C$ and $L_C$, respectively) are biased by a current source circuit 102 and current sink circuit 101, each of which generates a bias current $I_B$. The diode 103 is used to reduce the voltage drop across transistor P102, but is not necessary and, therefore, can be omitted by connecting the drain of transistor P102 directly to VSS/GND. Transistors P101 and P102 have identical threshold voltages $V_{th}$ and respective gate-to-source "on" voltages $V_{on(P101)}$ and $V_{on(P102)}$. Accordingly, the compensated voltage V(PVT) generated at the source of transistor P102 can be expressed as shown below in Equation 11.

$$V(PVT)=VDD-V_{gs(P101)}+V_{gs(P102)} \qquad \text{Eq. 11}$$

This expression can be rewritten by substituting for the gate-to-source voltages $V_{gs(P101)}$ and $V_{gs(P102)}$ of transistors P101 and P102, respectively, as shown below in Equation 12.

$$V(PVT)=VDD-(V_{th}+V_{on(P101)})+(V_{th}+V_{on(P102)}) \qquad \text{Eq. 12}$$

Simplifying further, this expression reduces to that shown below in Equation 13.

$$V(PVT)=VDD-(V_{on(P101)}-V_{on(P102)}) \qquad \text{Eq. 13}$$

Accordingly, the voltage $V_{on}$ across current sources 102 and 104, which is set equal to or greater than the required voltage $V_{P64}$ across the current mirror transistor P64 providing the noninverse component of the high-pass filtered signal $(I_{H(f)}+i_{H(f)})$ in the high-pass voltage-to-current converter 60 (FIG. 6), can be expressed as shown below in Equation 14.

$$V_{on}=V_{on(P101)}-V_{on(P102)} \qquad \text{Eq. 14}$$

This voltage V(PVT) is used, along with current sources 104, 105 and 106 to bias transistors P103 and P104 to generate the high $V_{High}$ and low $V_{Low}$ reference voltages. Diode-connected transistors P103 and P104 have equal channel width $W_A$ and length $L_A$ dimensions, which also equal the corresponding device dimensions of the transistors in the variable-gain mixer 70 (FIG. 7). Current source circuit 104 and sink circuit 105 generate bias currents $I_{Bias}$ equal to the DC bias currents $I_{Bias}$ used to bias the unity-gain voltage-to-current converter 50, the high-pass voltage-to-current converter 60 and the variable-gain mixer 70 (FIG. 4). Current sink circuit 106 generates a trickle current $I_T$ which is very low in value and is used to maintain transistor P104 in a minimal on state.

This circuit 100, because of the above-noted relationships between bias currents $I_{Bias}$ and transistor channel dimensions $W_A$, $L_A$, generates the high $V_{High}$ and low $V_{Low}$ reference voltages such that these voltages $V_{High}$, $V_{Low}$ track variations in the bias current $I_{Bias}$ as well as variations in the operating parameters of the transistors such as threshold voltage and charge carrier mobility. In turn, this allows the output current signal $(I_O+i_O)$ to also track variations in the bias current $I_{Bias}$ as well as variations in the operating parameters of the transistors such as threshold voltage and charge carrier mobility (e.g., due to variations in manufacturing processes and operating voltages and temperatures).

Figure 11:
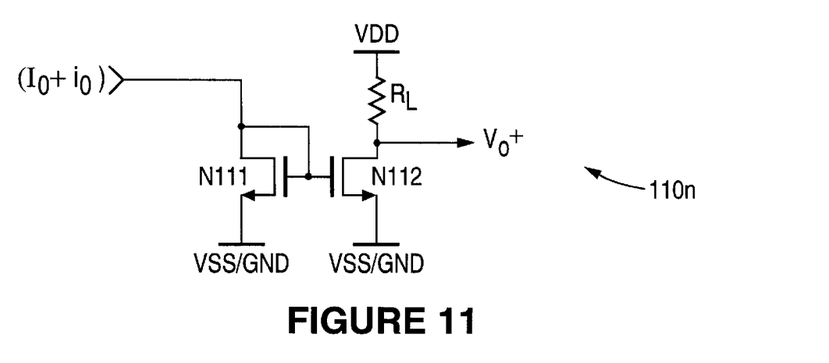
FIG. 11 is a schematic diagram of the "noninverse component" section of the current-to-voltage converter stage of the circuit of FIG. 4.

Referring to FIG. 11, the "noninverse component" section 110n of the output current-to-voltage converter 110 (FIG. 4) can be implemented as follows. (Only that portion 110n of the output current-to-voltage converter 110 which is responsible for processing the noninverse component of the differential output current is shown here; however, it should be understood that a similar section is used for processing the inverse component.) The output current signal $(I_O+i_O)$ drives the input to a current mirror formed by transistors N111 and N112. The output current through transistor N112 produces a voltage drop across the load resistor $R_L$, thereby generating the output voltage $V_o^+$.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a signal combining circuit gain controller that tracks operating variations due to variations in manufacturing processes and operating conditions by tracking variations in dc biasing, comprising:

a reference signal generator circuit that following reception of a first bias signal provides first and second reference signals which are responsive to said first bias signal but mutually independent, wherein variations in said first bias signal are tracked by corresponding respective variations in said first and second reference signals; and a signal conversion circuit, coupled to said reference signal generator circuit, that following reception of an input control signal and said first and second reference signals provides first and second output control signals, wherein said input control signal has a range of values with a minimum value and a maximum value, said first output control signal has a range of values which correspond to said input control signal values with minimum and maximum values which correspond to said minimum and maximum input control signal values, respectively, said second output control signal has a range of values which correspond to said input control signal values with minimum and maximum values which correspond to said maximum and minimum input control signal values, respectively, and said first and second output control signals together form a differential control signal.

2. The apparatus of claim 1, wherein:

said minimum and maximum values of said first output control signal correspond to said first and second reference signals, respectively; and said minimum and maximum values of said second output control signal correspond to said second and first reference signals, respectively.

3. The apparatus of claim 1, wherein said reference signal generator circuit comprises a plurality of diode-connected transistors that following reception of said first bias signal generate said first and second reference signals.

4. The apparatus of claim 1, wherein said signal conversion circuit comprises a digital-to-analog converter that following reception of a digital signal as said input control signal converts said digital signal to first and second analog signals as said first and second output control signals.

5. An apparatus including a signal combining circuit gain controller that tracks operating variations due to variations in manufacturing processes and operating conditions by tracking variations in dc biasing, comprising:
  a reference signal generator circuit that following reception of a first bias signal provides first and second reference signals, wherein variations in said first bias signal are tracked by corresponding respective variations in said first and second reference signals; and
  a signal conversion circuit, coupled to said reference signal generator circuit, that following reception of an input control signal and said first and second reference signals provides first and second output control signals, wherein
    said input control signal has a range of values with a minimum value and a maximum value,
    said first output control signal has a range of values which correspond to said input control signal values with minimum and maximum values which correspond to said minimum and maximum input control signal values, respectively,
    said second output control signal has a range of values which correspond to said input control signal values with minimum and maximum values which correspond to said maximum and minimum input control signal values, respectively, and
    said first and second output control signals together form a differential control signal,
    wherein said signal conversion circuit comprises a pulse density modulator that provides first and second pulse density modulated signals as said first and second output control signals following reception of said input control signal.

6. An apparatus including a signal combining circuit gain controller that tracks operating variations due to variations in manufacturing processes and operating conditions by tracking variations in dc biasing, comprising:
  a reference signal generator circuit that following reception of a first bias signal provides first and second reference signals, wherein variations in said first bias signal are tracked by corresponding respective variations in said first and second reference signals;
  a signal conversion circuit, coupled to said reference signal generator circuit, that following reception of an input control signal and said first and second reference signals provides first and second output control signals, wherein
    said input control signal has a range of values with a minimum value and a maximum value,
    said first output control signal has a range of values which correspond to said input control signal values with minimum and maximum values which correspond to said minimum and maximum input control signal values, respectively,
    said second output control signal has a range of values which correspond to said input control signal values with minimum and maximum values which correspond to said maximum and minimum input control signal values, respectively, and
    said first and second output control signals together form a differential control signal; and
  a signal combining circuit, coupled to said signal conversion circuit, that following reception of said first and second output control signals and a second bias signal which is substantially proportional to said first bias signal receives and combines a plurality of input signals and provides an output combination signal, wherein variations in said first bias signal are tracked by corresponding respective variations in said second bias signal and said output combination signal.

7. The apparatus of claim 6, wherein:
  said reference signal generator circuit comprises a first plurality of transistors that receive said first bias signal and generate said first and second reference signals;
  said signal combining circuit comprises a second plurality of transistors that receive said first and second output control signals and said second bias signal and receive and combine said plurality of input signals and provide said output combination signal; and
  said first and second pluralities of transistors together comprise a third plurality of transistors which have equal corresponding device dimensions.

8. The apparatus of claim 6, wherein said first and second bias signals comprise first and second bias currents.

9. An apparatus including a signal combining circuit gain controller that tracks operating variations due to variations in manufacturing processes and operating conditions by tracking variations in dc biasing, comprising:
  a reference signal generator circuit that following reception of a first bias signal provides first and second reference signals, wherein variations in said first bias signal are tracked by corresponding respective variations in said first and second reference signals;
  a signal conversion circuit, coupled to said reference signal generator circuit, that following reception of an input control signal and said first and second reference signals provides first and second output control signals, wherein
    said input control signal has a range of values with a minimum value and a maximum value,
    said first output control signal has a range of values which correspond to said input control signal values with minimum and maximum values which correspond to said minimum and maximum input control signal values, respectively,
    said second output control signal has a range of values which correspond to said input control signal values with minimum and maximum values which correspond to said maximum and minimum input control signal values, respectively, and
    said first and second output control signals together form a differential control signal;
  a signal combining circuit, coupled to said signal conversion circuit, that following reception of said first and second output control signals receives and combines a plurality of input signals and provides an output combination signal; and
  a signal filter circuit, coupled to said signal combining circuit, that following reception of a second bias signal which is substantially proportional to said first bias signal receives and filters another input signal and provides one of said plurality of input signals, wherein variations in said first bias signal are tracked by corresponding respective variations in said second bias signal and said output combination signal.

10. The apparatus of claim 9, wherein:

said reference signal generator circuit comprises a first plurality of transistors that receive said first bias signal and generate said first and second reference signals;

said signal combining circuit comprises a second plurality of transistors that receive said first and second output control signals and said second bias signal and receive and combine said plurality of input signals and provide said output combination signal; and said first and second pluralities of transistors together comprise a third plurality of transistors which have equal corresponding device dimensions.

11. An apparatus including a signal combining circuit gain controller that tracks operating variations due to variations in manufacturing processes and operating conditions by tracking variations in dc biasing, comprising:

a reference signal generator circuit with a plurality of diode-connected transistors that following reception of a first bias current provides first and second reference voltages which are responsive to said first bias signal but mutually independent, wherein variations in said first bias current are tracked by corresponding respective variations in said first and second reference voltages; and a digital-to-analog signal conversion circuit, coupled to said reference signal generator circuit, that following reception of a digital control signal and said first and second reference voltages provides first and second analog control voltages, wherein said digital control signal has a range of values with a minimum value and a maximum value, said first analog control voltage has a range of values which correspond to said digital control signal values with minimum and maximum values which correspond to said minimum and maximum digital control signal values, respectively, said second analog control voltage has a range of values which correspond to said digital control signal values with minimum and maximum values which correspond to said maximum and minimum digital control signal values, respectively, and said first and second analog control voltages together form a differential control voltage.

12. The apparatus of claim 11, wherein:

said minimum and maximum values of said first analog control voltage correspond to said first and second reference voltages, respectively; and said minimum and maximum values of said second analog control voltage correspond to said second and first reference voltages, respectively.

13. An apparatus including a signal combining circuit gain controller that tracks operating variations due to variations in manufacturing processes and operating conditions by tracking variations in dc biasing, comprising:

a reference signal generator circuit with a plurality of diode-connected transistors that following reception of a first bias current provides first and second reference voltages, wherein variations in said first bias current are tracked by corresponding respective variations in said first and second reference voltages;

a digital-to-analog signal conversion circuit, coupled to said reference signal generator circuit, that following reception of a digital control signal and said first and second reference voltages provides first and second analog control voltages, wherein said digital control signal has a range of values with a minimum value and a maximum value, said first analog control voltage has a range of values which correspond to said digital control signal values with minimum and maximum values which correspond to said minimum and maximum digital control signal values, respectively, said second analog control voltage has a range of values which correspond to said digital control signal values with minimum and maximum values which correspond to said maximum and minimum digital control signal values, respectively, and said first and second analog control voltages together form a differential control voltage; and a signal combining circuit, coupled to said digital-to-analog signal conversion circuit, that following reception of said first and second analog control voltages and a second bias current which is substantially proportional to said first bias current receives and combines a plurality of input currents and provides an output combination current, wherein variations in said first bias current are tracked by corresponding respective variations in said second bias current and said output combination current.

14. The apparatus of claim 13, wherein:

said signal combining circuit comprises a plurality of differentially-connected transistors that receive said first and second analog control voltages and said second bias current and receives and combines said plurality of input currents and provides said output combination current; and said pluralities of diode-connected and differentially-connected transistors together comprise a plurality of transistors which have equal corresponding device dimensions.

15. An apparatus including a signal combining circuit gain controller that tracks operating variations due to variations in manufacturing processes and operating conditions by tracking variations in dc biasing, comprising:

a reference signal generator circuit with a plurality of diode-connected transistors that following reception of a first bias current provides first and second reference voltages, wherein variations in said first bias current are tracked by corresponding respective variations in said first and second reference voltages;

a digital-to-analog signal conversion circuit, coupled to said reference signal generator circuit, that following reception of a digital control signal and said first and second reference voltages provides first and second analog control voltages, wherein said digital control signal has a range of values with a minimum value and a maximum value, said first analog control voltage has a range of values which correspond to said digital control signal values with minimum and maximum values which correspond to said minimum and maximum digital control signal values, respectively, said second analog control voltage has a range of values which correspond to said digital control signal values with minimum and maximum values which correspond to said maximum and minimum digital control signal values, respectively, and said first and second analog control voltages together form a differential control voltage;

a signal combining circuit, coupled to said digital-to-analog signal conversion circuit, that following reception of said first and second analog control voltages receives and combines a plurality of input currents and provides an output combination current; and a signal filter circuit, coupled to said signal combining circuit, that following reception of a second bias current which is substantially proportional to said first bias current receives and filters an input voltage and provides one of said plurality of input currents, wherein variations in said first bias current are tracked by corresponding respective variations in said second bias current and said output combination current.

16. The apparatus of claim 15, wherein:

said signal combining circuit comprises a plurality of differentially-connected transistors that receive said first and second analog control voltages and said second bias current and receive and combine said plurality of input currents and provide said output combination current; and said pluralities of diode-connected and differentially-connected transistors together comprise a plurality of transistors which have equal corresponding device dimensions.

17. A method of providing gain control for a signal combining circuit while tracking operating variations due to variations in manufacturing processes and operating conditions by tracking variations in dc biasing, comprising the steps of:

receiving a first bias signal and generating first and second reference signals which are responsive to said first bias signal but mutually independent, wherein variations in said first bias signal are tracked by corresponding respective variations in said first and second reference signals; and receiving an input control signal and said first and second reference signals and generating first and second output control signals, wherein said input control signal has a range of values with a minimum value and a maximum value, said first output control signal has a range of values which correspond to said input control signal values with minimum and maximum values which correspond to said minimum and maximum input control signal values, respectively, said second output control signal has a range of values which correspond to said input control signal values with minimum and maximum values which correspond to said maximum and minimum input control signal values, respectively, and said first and second output control signals together form a differential control signal.

18. The method of claim 17, wherein said step of receiving an input control signal and said first and second reference signals and generating first and second output control signals comprises receiving said input control signal and said first and second reference signals and generating said second and first output control signals such that:

said minimum and maximum values of said first output control signal correspond to said first and second reference signals, respectively; and said minimum and maximum values of said second output control signal correspond to said first and second reference signals, respectively.

19. The method of claim 17, wherein said step of receiving an input control signal and said first and second reference signals and generating first and second output control signals comprises receiving a digital signal as said input control signal and converting said digital signal to first and second analog signals as said first and second output control signals.

20. A method of providing gain control for a signal combining circuit while tracking operating variations due to variations in manufacturing processes and operating conditions by tracking variations in dc biasing, comprising the steps of:

receiving a first bias signal and generating first and second reference signals, wherein variations in said first bias signal are tracked by corresponding respective variations in said first and second reference signals; and receiving an input control signal and said first and second reference signals and generating first and second output control signals by generating first and second pulse density modulated signals as said first and second output control signals in response to said input control signal, wherein said input control signal has a range of values with a minimum value and a maximum value, said first output control signal has a range of values which correspond to said input control signal values with minimum and maximum values which correspond to said minimum and maximum input control signal values, respectively said second output control signal has a range of values which correspond to said input control signal values with minimum and maximum values which correspond to said maximum and minimum input control signal values, respectively, and said first and second output control signals together form a differential control signal.

21. A method of providing gain control for a signal combining circuit while tracking operating variations due to variations in manufacturing processes and operating conditions by tracking variations in dc biasing, comprising the steps of:

receiving a first bias signal and generating first and second reference signals, wherein variations in said first bias signal are tracked by corresponding respective variations in said first and second reference signals;

receiving an input control signal and said first and second reference signals and generating first and second output control signals, wherein said input control signal has a range of values with a minimum value and a maximum value, said first output control signal has a range of values which correspond to said input control signal values with minimum and maximum values which correspond to said minimum and maximum input control signal values, respectively, said second output control signal has a range of values which correspond to said input control signal values with minimum and maximum values which correspond to said maximum and minimum input control signal values, respectively, and said first and second output control signals together form a differential control signal; and receiving said first and second output control signals and a second bias signal which is substantially proportional to said first bias signal and receiving and combining a plurality of input signals and generating an output combination signal, wherein variations in said first bias signal are tracked by corresponding respective variations in said second bias signal and said output combination signal.

22. The method of claim 21, wherein:
said step of receiving a first bias signal and generating first and second reference signals comprises receiving said first bias signal and generating said first and second reference signals with a first plurality of transistors;
said step of receiving said first and second output control signals and a second bias signal which is substantially proportional to said first bias signal and receiving and combining a plurality of input signals and generating an output combination signal comprises receiving said first and second output control signals and said second bias signal and receiving and combining said plurality of input signals and generating said output combination signal with a second plurality of transistors; and
said first and second pluralities of transistors together comprise a third plurality of transistors which have equal corresponding device dimensions.

23. The method of claim 21, wherein:
said step of receiving a first bias signal and generating first and second reference signals comprises receiving a first bias current as said first bias signal; and
said step of receiving said first and second output control signals and a second bias signal which is substantially proportional to said first bias signal and receiving and combining a plurality of input signals and generating an output combination signal comprises receiving a second bias current as said second bias signal.

24. A method of providing gain control for a signal combining circuit while tracking operating variations due to variations in manufacturing processes and operating conditions by tracking variations in dc biasing, comprising the steps of:
receiving a first bias signal and generating first and second reference signals, wherein variations in said first bias signal are tracked by corresponding respective variations in said first and second reference signals;
receiving an input control signal and said first and second reference signals and generating first and second output control signals, wherein
said input control signal has a range of values with a minimum value and a maximum value,
said first output control signal has a range of values which correspond to said input control signal values with minimum and maximum values which correspond to said minimum and maximum input control signal values, respectively,
said second output control signal has a range of values which correspond to said input control signal values with minimum and maximum values which correspond to said maximum and minimum input control signal values, respectively, and
said first and second output control signals together form a differential control signal;
receiving said first and second output control signals and receiving and combining a plurality of input signals and generating an output combination signal; and
receiving a second bias signal which is substantially proportional to said first bias signal and receiving and filtering another input signal and generating one of said plurality of input signals, wherein variations in said first bias signal are tracked by corresponding respective variations in said second bias signal and said output combination signal.

25. The method of claim 24, wherein:
said step of receiving a first bias signal and generating first and second reference signals comprises receiving said first bias signal and generating said first and second reference signals with a first plurality of transistors;
said step of receiving said first and second output control signals and receiving and combining a plurality of input signals and generating an output combination signal comprises receiving said second bias signal and receiving and combining said plurality of input signals and generating said output combination signal with a second plurality of transistors; and
said first and second pluralities of transistors together comprise a third plurality of transistors which have equal corresponding device dimensions.

26. A method of providing gain control for a signal combining circuit while tracking operating variations due to variations in manufacturing processes and operating conditions by tracking variations in dc biasing, comprising the steps of:
receiving a first bias current and generating first and second reference voltages with a plurality of diode-connected transistors, wherein said first and second reference voltages are responsive to said first bias signal but mutually independent and variations in said first bias current are tracked by corresponding respective variations in said first and second reference voltages; and
receiving a digital control signal and said first and second reference voltages and generating first and second analog control voltages, wherein
said digital control signal has a range of values with a minimum value and a maximum value,
said first analog control voltage has a range of values which correspond to said digital control signal values with minimum and maximum values which correspond to said minimum and maximum digital control signal values, respectively,
said second analog control voltage has a range of values which correspond to said digital control signal values with minimum and maximum values which correspond to said maximum and minimum digital control signal values, respectively, and
said first and second analog control voltages together form a differential control voltage.

27. The method of claim 26, wherein said step of receiving a digital control signal and said first and second reference voltages and generating first and second analog control voltages comprises receiving said digital control signal and said first and second reference voltages and generating said first and second analog control voltages such that:
said minimum and maximum values of said first analog control voltage correspond to said first and second reference voltages, respectively; and
said minimum and maximum values of said second analog control voltage correspond to said second and first reference voltages, respectively.

28. A method of providing gain control for a signal combining circuit while tracking operating variations due to variations in manufacturing processes and operating conditions by tracking variations in dc biasing, comprising the steps of:
receiving a first bias current and generating first and second reference voltages with a plurality of diode-connected transistors, wherein variations in said first bias current are tracked by corresponding respective variations in said first and second reference voltages;

receiving a digital control signal and said first and second reference voltages and generating first and second analog control voltages, wherein
said digital control signal has a range of values with a minimum value and a maximum value,
said first analog control voltage has a range of values which correspond to said digital control signal values with minimum and maximum values which correspond to said minimum and maximum digital control signal values, respectively,
said second analog control voltage has a range of values which correspond to said digital control signal values with minimum and maximum values which correspond to said maximum and minimum digital control signal values, respectively, and
said first and second analog control voltages together form a differential control voltage; and receiving said first and second analog control voltages and a second bias current which is substantially proportional to said first bias current and receiving and combining a plurality of input currents and generating an output combination current, wherein variations in said first bias current are tracked by corresponding respective variations in said second bias current and said output combination current.

29. The method of claim 28, wherein:

said step of receiving said first and second analog control voltages and a second bias current which is substantially proportional to said first bias current and receiving and combining a plurality of input currents and generating an output combination current comprises receiving said first and second analog control voltages and said second bias current and receiving and combining said plurality of input currents and generating said output combination current with a plurality of differentially-connected transistors; and said pluralities of diode-connected and differentially-connected transistors together comprise a plurality of transistors which have equal corresponding device dimensions.

30. A method of providing gain control for a signal combining circuit while tracking operating variations due to variations in manufacturing processes and operating conditions by tracking variations in dc biasing, comprising the steps of:

receiving a first bias current and generating first and second reference voltages with a plurality of diode-connected transistors, wherein variations in said first bias current are tracked by corresponding respective variations in said first and second reference voltages;

receiving a digital control signal and said first and second reference voltages and generating first and second analog control voltages, wherein
said digital control signal has a range of values with a minimum value and a maximum value,
said first analog control voltage has a range of values which correspond to said digital control signal values with minimum and maximum values which correspond to said minimum and maximum digital control signal values, respectively,
said second analog control voltage has a range of values which correspond to said digital control signal values with minimum and maximum values which correspond to said maximum and minimum digital control signal values, respectively, and
said first and second analog control voltages together form a differential control voltage;

receiving said first and second analog control voltages and receiving and combining a plurality of input currents and generating an output combination current; and receiving a second bias current which is substantially proportional to said first bias current and receiving and filtering an input voltage and generating one of said plurality of input currents, wherein variations in said first bias current are tracked by corresponding respective variations in said second bias current and said output combination current.

31. The method of claim 30, wherein:

said step of receiving said first and second analog control voltages and receiving and combining a plurality of input currents and generating an output combination current comprises receiving said first and second analog control voltages and said second bias current and receiving and combining said plurality of input currents and generating said output combination current with a plurality of differentially-connected transistors; and said pluralities of diode-connected and differentially-connected transistors together comprise a plurality of transistors which have equal corresponding device dimensions.

* * * * *

UNITED STATES PATENT AND TRADEMARK OFFICE
CERTIFICATE OF CORRECTION

PATENT NO.    : 6,259,302 B1  
DATED         : July 10, 2001  
INVENTOR(S)   : Abhijit Phanse et al.

It is certified that error appears in the above-identified patent and that said Letters Patent is hereby corrected as shown below:

<u>Column 14,</u>
Line 29, insert a comma after "respectively."

Signed and Sealed this

Twenty-sixth Day of February, 2002

Attest:

JAMES E. ROGAN  
*Attesting Officer*    *Director of the United States Patent and Trademark Office*